United States Patent

[11] 3,628,580

[72] Inventor Zachary L. Langston
 Rt. 2, Box 66, Locust Grove, Okla. 84352
[21] Appl. No. 789,471
[22] Filed Jan. 7, 1969
[45] Patented Dec. 21, 1971

[54] NUT-CRACKING MACHINE
 4 Claims, 7 Drawing Figs.

[52] U.S. Cl. ................................................ 146/12
[51] Int. Cl. ................................................ A23n 5/02
[50] Field of Search ................................. 146/12,
 1.11

[56] References Cited
 UNITED STATES PATENTS
 1,965,460 7/1934 Gebhardt ............... 146/12
 2,002,289 5/1935 Hancock ............... 146/12
 2,518,274 8/1950 Besag ............... 146/1.11
 2,722,252 11/1955 Kennedy ............... 146/12

*Primary Examiner*—Andrew R. Juhasz
*Assistant Examiner*—Z. R. Bilinsky
*Attorney*—Robert E. Massa ABSTRACT: A nut-cracking machine which includes vacuum pickup means to position a nut in nut-cracking means operably interconnected with said vacuum pickup means, said nut-cracking means including hydraulic means to automatically adjust the nut-cracking means to the size of the nut and also provide stop means for a nut-cracking die of the nut-cracking means.

INVENTOR.
ZACHARY L. LANGSTON

BY *Robert C. Marrs*
ATTORNEY

INVENTOR.
ZACHARY L. LANGSTON

BY
Robert C. Mason

ATTORNEY

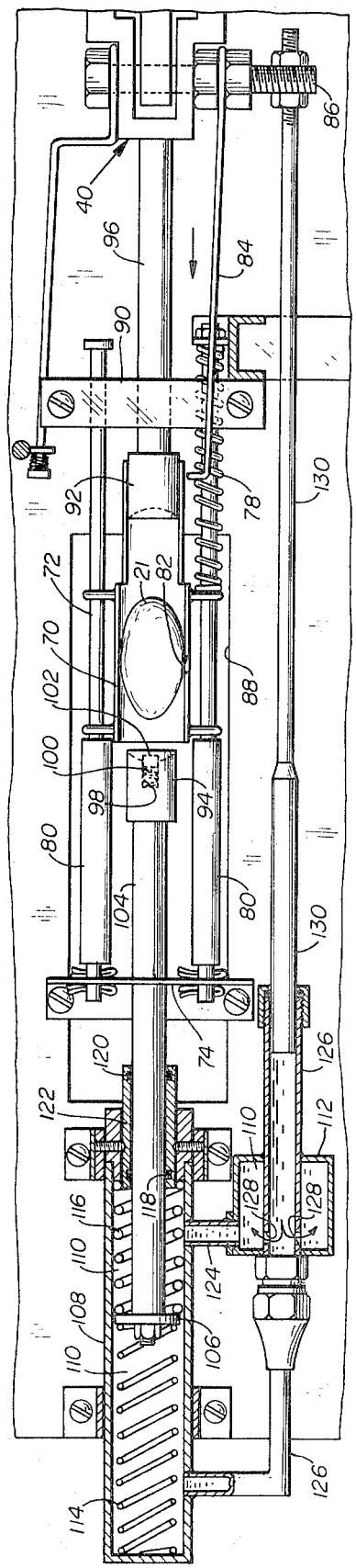

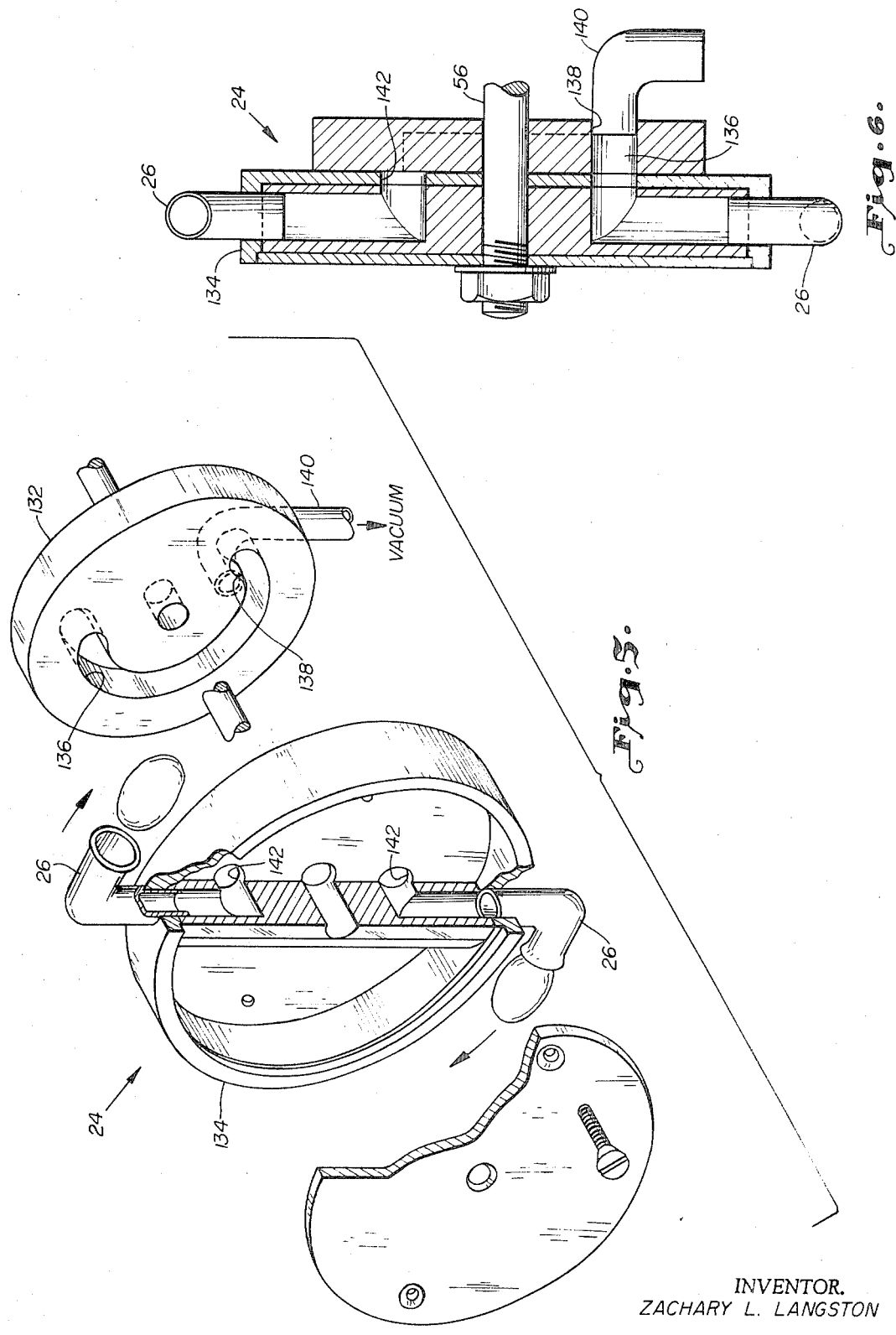

NUT-CRACKING MACHINE

BACKGROUND OF THE INVENTION

This invention relates to nut-cracking machines, and more particularly to to nut-cracking machines which are adaptable to crack nuts of varying sizes in a simple and efficient manner, and still more particularly to nut-cracking machines which are adaptable automatically to crack nuts of varying sizes. Still more particularly, this invention relates to nut-cracking machines having hydraulically adjustable nut-cracking means.

The harvesting of edible nuts constitutes an important crop in agricultural economy, and means have been consistently sought for a long period of time to provide for efficient and economical preparation of nuts for the market. Some nuts, such as pecans, are more suitably prepared for the market by being cracked and shelled with the nutmeats packaged ready-to-use. Then, usage of the nutmeats is more profitably accomplished when the nutmeats are able to be removed whole from the cracked shells. However, the variance in the size of nuts, even those of the same variety, have made a difficult task of the attempt to crack the nuts to an extent whereby the nutmeats may all be removed in a whole condition from their cracked shells. Various nut-cracking machines have been devised to attempt to solve this problem, as for example, those described in the following U.S. Pat. Nos. 2,128,874 to Meyer, 2,209,606 to Meyer, and 2,273,759 to Maulsby. All these devices are complex mechanical nut-cracking machines operating differently than the machine of the applicant.

The primary object of this invention is to provide a nut-cracking machine which is simple in construction, efficient in operation, and inexpensive to manufacture. Another object of this invention is to provide a nut-cracking machine which is efficient in operation in cracking the shell of a nut without crushing the nutmeat. Still another object of this invention is to provide a nut-cracking machine which automatically adjusts itself as to the length of each nut to be cracked so that the nut can be cracked with the nutmeat generally left intact. Still another object of this invention is to provide a nut-cracking machine having novel means for adjusting the machine. Still another object of this invention is to provide a nut-cracking machine having hydraulically limited cracking means. Still another object of this invention is to provide a nut-cracking machine having a novel means for positioning a nut. Another object of this invention is to provide a nut-cracking machine having a novel means for positioning a nut which is accomplished by vacuum means.

BRIEF DESCRIPTION OF THE DRAWINGS

Further objects and advantages of the invention will become apparent from the following description and claims, and from the accompanying drawings, wherein:

FIG. 3 is a fragmentary plan view of the nut-cracking portion of the device of this invention in the position it assumes after having cracked a nut.

FIG. 4 is a fragmentary plan view similar to FIG. 3 a short interval later.

FIG. 5 is an exploded perspective view of a vacuum pickup portion of a nut-cracking machine according to this invention.

FIG. 6 is a sectional view of this vacuum pickup portion of FIG. 5.

DESCRIPTION OF THE PREFERRED EMBODIMENTS

A nut-cracking machine according to this invention comprises a storage hopper for nuts positioned on a support frame, with the storage hopper having an outlet for nuts permitting the nuts to rest in position to be picked up by series of tubelike individual pickup means which are positioned on a rotatable plate member disposed on a shaft held in position on the support frame. The nuts are held in position on each pickup member by vacuum and as each tubelike member holding a nut is in proper position over a nut-receiving channel the vacuum condition holding the nut is cut off because of the interior geometry of the rotating plate member, the nut is dropped into the nut-receiving channel adjacent the vacuum pickup means and is in position to move into the nut-cracking portion of the device. The vacuum for the pickup means is supplied by a vacuum pump operably connected to motor means on the support frame, and the rotative movement of the plate member holding each pickup member is by drivable connection of the shaft member with the motor means. A gate member at the lower end of said channel member is interconnected with the motor means, and at the proper moment, is opened to permit the nut to move onto troughlike member portion of nut-cracking means. Then at the proper time a first die member interconnected with the motor means pushes the nut longitudinally against a second hydraulically positionable die member to crack the nut, and subsequent to the cracking operation, nut removing means operably connected to the motor means removes the nut from the nut-cracking means and a next nut comes into position to be cracked. Each of the operating components of the nut-cracking device are adjustable as to their time of operation so that proper variations can be made in the time the nut is dropped from the vacuum component, the time it is received in the nut-cracking means, the time it is acted against by each nut-cracking die, and the time it is removed from the nut-cracking means. The hydraulic die member is on a piston shaft slidably movable in a hydraulic cylinder which is in hydraulic communication with reservoir for hydraulic fluid. The hydraulic reservoir has an inlet and an outlet and includes a piston shaft interconnected with the nut-receiving means, said first die, and said nut-removing means, the piston shaft being positionable with relation to the reservoir to close the outlet at predeterminable intervals to cause the hydraulically positionable die to remain in a substantially stable position. The position of the second hydraulically positionable die is automatically adjusted for the length of each nut, regardless of the different lengths of nuts which may be receivably interspersed in the nut-receiving means.

Figure 1:
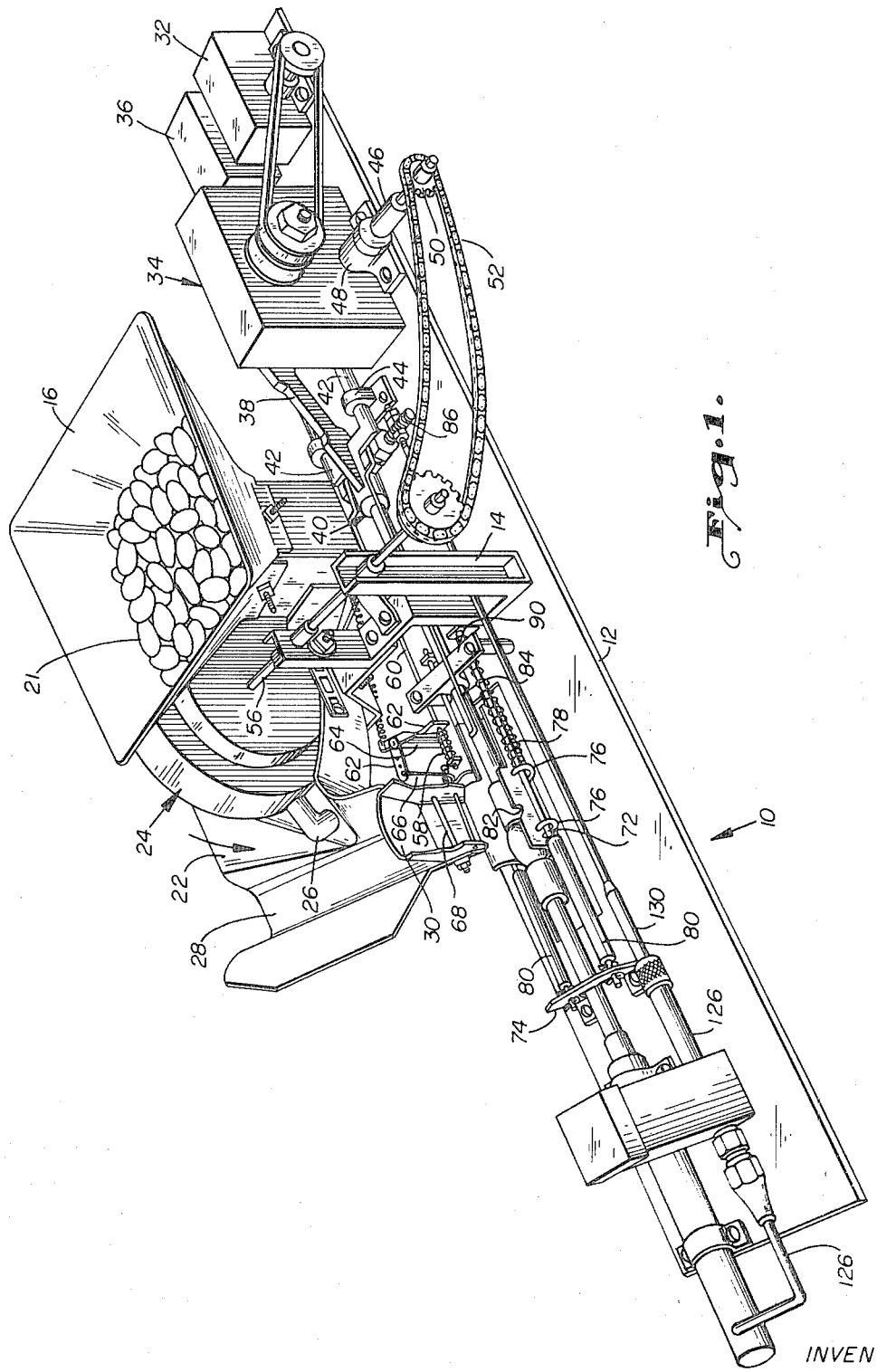
FIG. 1 is a perspective view of a nut-cracking machine according to this invention.
Figure 1A:
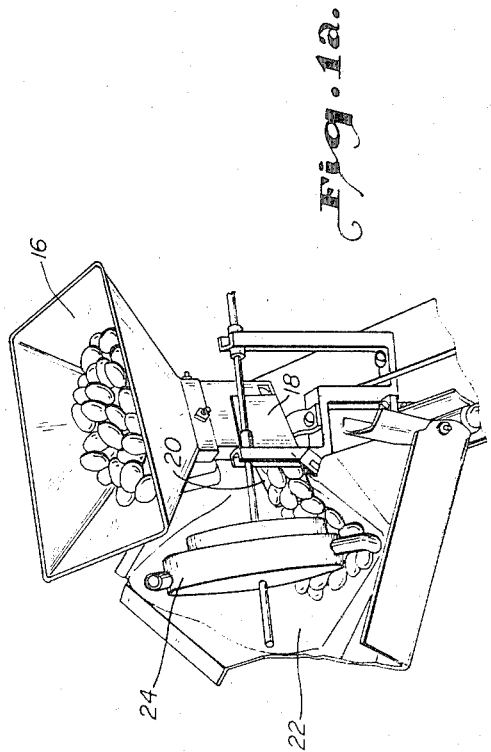
FIG. 1a is a perspective view of a nut pickup hopper component of the invention.

Referring now to the drawings in detail, in FIG. 1, a nut-cracker 10, generally, according to this invention, includes a base member 12 upon which the various components rest. A cross frame 14 provides a means for the attachment and support of a nut storage hopper 16 and other operating components described hereinafter. Nut storage hopper 16 has an outlet (not shown) communicating with a nut passageway 18 which has an outlet 20 permitting nuts 21 to pass by gravity feed from the nut storage hopper 16 to a nut pickup hopper 22, shown in FIG. 1a. A certain amount of nuts 21 are permitted to rest in the lower portion of hopper 22 whose two sides join to form a somewhat circular edge portion slightly larger than a vacuum pickup wheel 24 which rotates in a substantial portion of hopper 22 to remove nuts therefrom. Vacuum pickup wheel 24 includes a tubular pickup member 26 which is connected to a source of vacuum in a manner hereinafter described to pick up an individual nut 21 as it passes through the lower section of hopper 22, carry the nut with it on its rotative journey to drop the nut in a manner also as described later, in a nut-receiving channel 28. At its lower end nut-receiving channel 28 is closed by a gate member 30 which is interconnected with other operating components to open and close at predetermined intervals to permit one nut at a time to pass to a nut-cracking means adjacent thereto. Power means, which may be an electric motor 32, is employed to drive all components of the nut-cracking device, preferably through use of a gearbox 34 generally, connected to motor 32 by means of belt 33 around conventional pulleys 33a, which gearbox may have selected gears incorporated therein to provide chosen ratios. The power means, as by motor 32 may also be used to drive a vacuum pump 36 which is employed to provide proper vacuum for the vacuum pickup means. Most of the operating components are driven by a crank member 38 eccentrically connected to gearbox 34 at one end and pivotally connected at the other end to a double shaft member 40 having each of its arms 42 received slidably in a bearing 44. Several components of the nut-cracking device are operably connected to double shaft member 40 as hereinafter specifically described. One component of gearbox 34 may be externally connected to a shaft 46 disposed in bearing 48 which shaft has a gearwheel 50 positioned to drive, by means of chain 52, another gearwheel 54 on shaft 56 bearably disposed in cross frame 14 to drive rotatably certain components of nut pickup wheel 24 hereinafter described in FIGS. 5 and 6.

Gate member 30 is biased to a normally closed position by coil spring 58 on lever 60 which is connected to arm 42. Coil spring 58 biases against a portion of arm member 62 which is arranged pivotally on support 64 and connected leverably to gate member 30 by connection with rod member 66. One end of arm member 62 is arranged slidably on lever 60 so that movement of crank 38 in a direction away from nut channel 28 and gate member 30 will cause arm member 62 to pivot and in turn cause rod member 66 to move slightly upward causing gate member 30 to pivot on shaft 68 providing an opening between gate member 30 and nut channel 28 so that a nut may roll from nut channel 28 onto trough member 70. The nut rests on trough member 70 prior to cracking by the nut-cracking means. Trough member 70 moves slidably on rods 72 which are secured by any suitable means to support member 74. Loop members 76 secured to trough member 70 provide means for this slidable movement. Trough member 70 is biased to a normal position in front of gate member 30 by means of a coil spring 78 acting to push trough member against stop means 80. An important feature of trough member 70 is the inclusion of slot 82 which cooperates with hook 84 to cause trough member 70 to move away from in front of gate member 30 at the proper predetermined time for the purpose of removing therefrom a nut which has just been cracked. Hook 84 is attached at one end to shaft means 86 passing through shaft 40. Shaft means 86 may be any form of shaft providing suitable attachment for crank 38, lever 60, and hook 84, as well as other timeable components of the device, and if desired, each may be so attached thereto as to permit proper degree of adjustment for better timing of the various components. Hook 84 is slightly biased downward adjustably to engage slot 82 and pull trough member 70 toward gearbox 34 during a portion of its cyclical movement, and is disengaged from slot 82 as hook 84 enters a subsequent portion of its movement. Thus, trough member 70 is caught by hook 84 shortly after a nut is cracked and is pulled back with hook 84, and since at this time only a minor portion of the nut is resting on trough member 70, the nut falls, by its own imbalance from the trough member 70, through an opening 88, as shown in FIG. 3, to a container held below the nut-cracking device or permitted to move out of the way of the nut-cracking means as may otherwise be desired, as by rolling along a channel in the support frame to a side container. Hook 84 is raised sufficiently to become disengaged from slot 82 as it passes over bar member 90 of the support frame. Then trough member 70 is pushed back to its normal position by action of coil spring 78.

The nut-cracking means of this invention are provided by action of a first nut-cracking die 92 which pushes a nut against a second nut-cracking die 94. First nut-cracking die 92 is positioned on a shaft 96 which is secured to double shaft 40 and receives its oscillatory motion from movement of shaft 40. Each nut-cracking die 92 and 94 has a concave face which assists in positioning and holding each nut between the dies during the cracking operation. A depression 98 is provided in nut-cracking die 94 and a coil spring 100 and expulsion member 102 are positioned therein. Thus, as a nut is cracked, member 102 fits snugly within the contour of die 94, and after the nut-cracking pressure is released, coil spring 100 pushes against expulsion member 102 to assist in removing the nut from the die member.

During the forward movement of nut-cracking die 92 toward second die member 94, with a nut resting at that time on trough member 70, die 92 contacts the nut and pushes it along the trough member 70 until contact is made with second die 94. At the moment of contact the nut is raised slightly above trough member 70 because of the concavity of the surface of each die member, and the shell of the nut is therefore permitted to expand in all directions during the actual cracking of the nut.

Second nut-cracking die 94 is positioned on shaft 104 which is secured to piston 106 operating slidably within cylinder 108 to provide means for hydraulically positioning of die 94. Hydraulic fluid 110 is maintained in reservoir 112 and is in contact with both faces of piston 106. Coil springs 114 and 116 are positioned within cylinder 108 and are each acting against piston 106 to provide proper positioning of piston 106 and proper resistance to movement of piston 106 as may be desired. Sealing members 118 and 120 are provided within suitable bushing as bushing 122 to provide proper sealing for the hydraulic fluid within cylinder 108. Communication for the hydraulic fluid between reservoir 112 and each face of piston 106 is provided by means of lines 124 and 126. Line 126 provides communication with reservoir 112 by means of openings 128.

An important unique feature of the invention is the manner in which the nut-cracking means is automatically positionable to compensate for different lengths of nuts. Rod member 130, attached to shaft 86 by suitable means which may be adjustable, moves slidably within line 126 in the manner of a piston. Initially, a nut resting on trough member 70 is in approximately the position shown in FIG. 4. Then, as die member 92 moves forward to contact the nut by action of crank 38 and double shaft 40, the front surface of die member 92 pushes the nut against the front surface of die member 94, moving piston 106 in cylinder 108 until rod member 130 covers openings 128, at which time communication of hydraulic fluid between reservoir 112 and line 126 is cut off. Thus, the hydraulic fluid in line 126 and in cylinder 108 acts as a brake for further movement of piston 106. At this time, by suitable adjustments of rod member 130, stoppage of piston 106 (and consequently, die member 94) occurs slightly before crank 38 reaches its dead center position. Then, the next slight motion of crank 38 imparts the necessary cracking force to the nut. It can be seen by this description that the movement of rod member 130 will be different for different lengths of nuts, permitting die member 94 to be automatically positionable depending upon the length of each nut.

Figure 2:
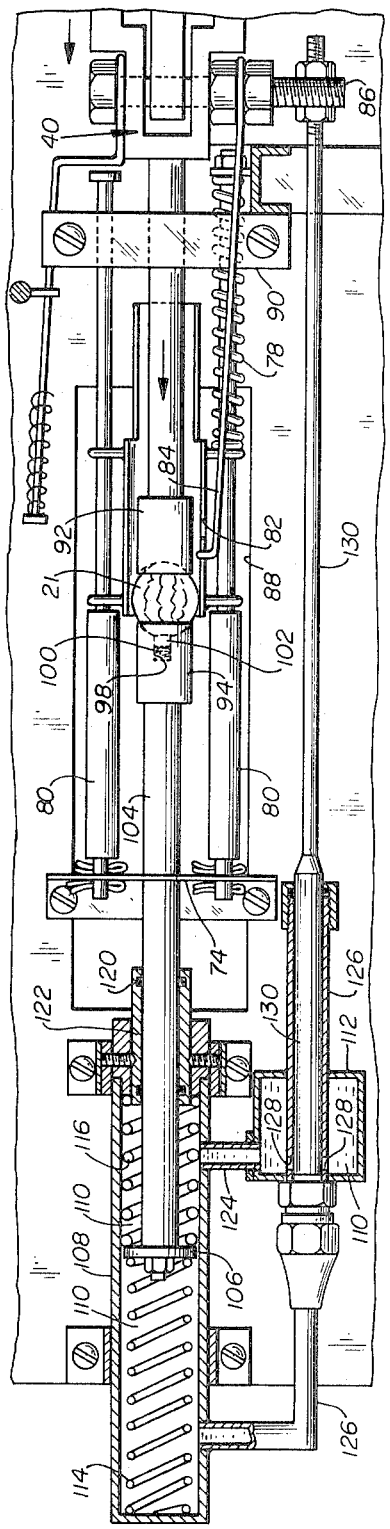
FIG. 2 is a fragmentary plan view of a nut-cracking machine according to this invention showing the nut-cracking portion of the device as it is in position to crack a nut.

FIG. 2 describes the positions of certain components immediately after a nut has been cracked. Rod member 130 has covered openings 128 holding die member 94 in stable position. Rod 82 has not yet entered slot 82, thus trough member 70 is still in its normal position.

In FIG. 3 rod member 84 has entered slot 82 and is pulling trough member 70 with it away from the normal position of trough 70. The nut 21 is ready to fall through opening 88.

In FIG. 4 rod member 84 has already been removed from slot 82 and trough member 70 has returned to its normal position in front of gate member 30. A next nut has fallen into trough member 70, die member 92, rod member 84, and rod member 130 have begun their forward journey. Piston 94 has not yet been contacted by the nut, and has sprung back to its normal position by operation of springs 114 and 115. From this figure it can be seen that die member 92 will contact the nut before rod member 130 covers openings 128.

FIGS. 5 and 6 show the various components of the vacuum pickup means of the invention. Vacuum pickup wheel 24, generally, is mounted on shaft 56 in a manner that timing plate 132 is positioned nonrotatably (as by splining) but adjustably on shaft 56, and wheel 134 is positioned rotatably on shaft 56. Timing plate 132 has therein an arcuate channel 136 which has an opening 138 into which a vacuum tube 140 is positioned. Vacuum tube 140 is connected to vacuum pump 36 in any suitable manner. One manner of constructing a wheel member to carry tubular pickup members 26 is shown. Pickup members 26 are secured to the rim of wheel 134 and communicate with an opening 142. Thus, as wheel 134 rotates, each tubular pickup member 26 in turn is in communication with channel 136 and consequently to the source of vacuum. This communication is timed so that it occurs when that particular pickup member 26 is traversing the lower portion of nut pickup hopper 22. A nut is then contacted by the pickup member and held in place by the pressure differential created by the vacuum. As wheel 134 continues to rotate, opening 142 eventually comes out of contact with channel 136 and the vacuum holding the nut in place no longer exists. Then the nut is released from its position against pickup member 26, and at this time falls into nut-receiving channel 28 because of the proper timing and adjustment of each component.

In further operation, then, the nut rests against gate member 30 until shaft member 40 advances into its backward movement (away from die member 94), and coinciding with this movement lever 60 moves away from nut channel 28, causing gate 30 to be slightly opened as described above whereby a nut may roll onto trough member 70. By this time crank 38 has begun the next cycle of its oscillatory movement (by reason of its eccentric attachment to a gear member not shown), rod 60 has now caused gate 30 to be closed, and die member 92 is approaching the nut. Die member 92 shortly thereafter contacts the nut pushing it against die member 94, and pushes die member 94 until rod 130 closes the openings 128 as described above. Then the nut is cracked as crank 38 reaches dead center. As shaft 40 begins its backward movement, hook 84 engages slot 82 to pull trough member 70 with it, permitting the nut to fall through opening 88. At a slightly later time during this backward movement, hook 84 contacts bar 90 whereby hook 84 is disengaged from slot 82 and trough member 70 springs back to its normal position. Lever 60, which also moves backward with shaft 40, once again acts to open gate member 30 to cause the next nut to roll onto trough member 70 for the next cycle of operation.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A nut-cracking machine comprising
   a support frame,
   a storage hopper positioned on said frame, said storage hopper having a nut outlet,
   vacuum pickup means positionable on said frame to remove a nut from said nut outlet and place said nut in position to be cracked,
   nut-receiving means positionable to receive said nut from said vacuum pickup means,
   nut-removing means cooperating with said nut-receiving means to remove said nut from its nut-cracking position after being cracked,
   nut-cracking means positionable to accept a nut from said nut-receiving means and crack said nut, said nut-cracking means including
      a first nut-cracking die adjustably positionable on a shaft member, said first die aligned with a second, hydraulically positionable, nut-cracking die which is biased to a forward position, and
      a reservoir for hydraulic fluid having an inlet and an oulet and further includes a piston shaft interconnected with said nut receiving means, said first die, and said nut removing means, said piston shaft positionable with relation to said reservoir to close said outlet at predeterminable intervals to cause said second hydraulically positionable die to remain in a substantially stable position, and
      a trough member positionable adjacent said nut-receiving means to permit a nut to rest thereon after passing from said nut-receiving means,
   a source of vacuum for said vacuum pickup means,
   power means to impart motion to said nut-cracking means and said nut-removing means,
   said nut-receiving means, said first die, and said nut-removing means drivably interconnected with said power means, and
   said nut-receiving means including a channel member positionable adjacent said vacuum pickup means and adjacent said nut-cracking means, said nut-receiving means further having a gate member therewith interconnected with said power source to permit a nut to pass from said nut-receiving means at a predetermined interval.

2. A nut-cracking machine as described in claim 1 wherein said second hydraulically positionable die is on a piston shaft slidably movable in a hydraulic cylinder in hydraulic communication with said reservoir.

3. A nut-cracking machine as described in claim 2 wherein said vacuum pickup means includes a first and a second plate member, said first plate member being positioned nonrotatably on a shaft member, said first plate member further including an arcuate channel and an opening in a side opposite said channel, said opening permitting communication between said channel and said source of vacuum, and
   said second plate member being rotatably positioned on said shaft member planarly adjacent said first plate member, said second plate member further including a tubular pickup member circumferentially disposed on said second plate member and a vacuum passageway internally of said second plate member communicating with said pickup member and communicating with a side outlet in said second plate member, said side outlet disposed to be in communication with said arcuate channel of said first plate member during a first portion of rotating movement of said second plate member and out of communication with said arcuate channel during a second portion of said rotating movement, so that a nut is held in position on said tubular pickup member during communication of said outlet and said channel and can be released from said tubular member at a position when said outlet is out of communication with said channel, and said second plate member is drivably connected to said power means.

4. A nut-cracking machine as described in claim 3 wherein said source of vacuum includes a vacuum pump positioned on said support frame, said power means includes a motor positioned on said support frame, and said vacuum pump is operably connected to said motor.

* * * * *